United States Patent
Kodama et al.

(10) Patent No.: US 6,637,889 B2
(45) Date of Patent: Oct. 28, 2003

(54) IMAGE DISPLAY APPARATUS

(75) Inventors: Hiroyuki Kodama, Tokyo (JP); Atsushi Okuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/126,270

(22) Filed: Apr. 18, 2002

(65) Prior Publication Data

US 2002/0171811 A1 Nov. 21, 2002

(30) Foreign Application Priority Data

Apr. 26, 2001 (JP) .......................................... 2001-129618

(51) Int. Cl.[7] .............................................. G03B 21/14
(52) U.S. Cl. ............................................ 353/31; 353/37
(58) Field of Search ................................ 353/31, 34, 37, 353/33, 119, 102, 98, 99; 349/5, 7, 9

(56) References Cited

U.S. PATENT DOCUMENTS 5,738,426 A * 4/1998 Daijogo et al. ................ 353/31
6,179,423 B1 * 1/2001 Kato et al. ..................... 353/31
2002/0067469 A1 * 6/2002 Eguchi et al. ................. 353/31
2002/0113949 A1 * 8/2002 Sugawara ..................... 353/31

* cited by examiner

Primary Examiner—William Dowling
(74) Attorney, Agent, or Firm—Morgan & Finnegan, LLP

(57) ABSTRACT

An image display apparatus includes: a color separation optical system having a color separation optical member for reflecting a color light component in a specific wavelength range of the converging light and transmitting color light components in the other wavelength ranges. An optical axis of light incident on the color separation optical member forms an angle smaller than 45 degrees with a normal to a light incident surface of the color separation optical member.

18 Claims, 6 Drawing Sheets (a) DM1

(b) DM2

(c) TR (a) DM101

(b) DM102

(c) TR0

PRIOR ART

IMAGE DISPLAY APPARATUS

BACKGROUND OF THE INVENTION

1. Field of the Invention

The present invention relates to projection type image display apparatus for color separating illumination light to illuminate a plurality of image display devices with the separated light components and combining image light components emanating from these image display devices for projective display.

2. Description of the Related Art

In recent years, a projection type image display apparatus with an improved brightness and a compact size is needed.

FIG. 4 shows the configuration of a conventional projection type image display apparatus. In FIG. 4, white illumination light emitted from an illumination light source 101 is reflected by a reflector 102, passes through a fly eye lens A103, further reflected by a mirror M101, passes through a fly eye lens B104, a light polarization converting device 105 and a condenser lens 106, and then incident on a dichroic mirror DM101.

In general, as the illumination light source, a halogen lamp, a metal halide lamp, an ultra-high pressure mercury lamp or the like is used.

The dichroic mirror DM101 has a spectral transmittance shown in FIG. 5(a), in which a light component in a wavelength range for blue is reflected and a light component in a wavelength range for green to red is transmitted. The light component in the wavelength range for green to red passing through the dichroic mirror DM101 is incident on a dichroic mirror DM102. The dichroic mirror DM102 has a spectral transmittance shown in FIG. 5(b), in which a light component in a wavelength range for green is reflected and a light component in a wavelength range for red is transmitted.

The light component in the wavelength range for blue reflected by the dichroic mirror DM101 is turned 90 degrees by a reflecting mirror M102, passes through a field lens 107B, and incident on an image display device 108B, where the light is modulated in accordance with a signal input to the image display device 108B.

The light component in the wavelength range for green reflected by the dichroic mirror DM102 passes through a field lens 107G and is incident on an image display device 108G, where the light is modulated in accordance with a signal input to the image display device 108G.

The light component in the wavelength range for red transmitted through the dichroic mirror DM102 passes through a trimming filter TR0 having a spectral transmittance shown in FIG. 5(c), a condenser lens 111, a relay lens 112, reflecting mirrors M103, M104 and a field lens 107R, and then is incident on an image display device 108R, where the light is modulated.

The image light component for each color, modulated by the respective image display device 108R, 108B and 108G as described above, is incident on a cross dichroic prism 109. The light components in the wavelength ranges for blue and red are turned 90 degrees within the cross dichroic prism 109, while the light component in the wavelength range for green is transmitted as it is through the cross dichroic prism 109. Then, the light components of all the wavelength ranges emanate in combination.

The image light resulting from the color combination in the cross dichroic prism 109 is projected and displayed on a screen, not shown, by a projection lens 110.

In the conventional projection type image display apparatus configured in this manner, the dichroic mirror DM102 is disposed immediately before the image display device 108G and is responsible for separating the optical path of the light component in the wavelength range for green from the optical path of the light component in the wavelength range for red and for bending the optical path of the light component in the wavelength range for green. The dichroic mirror DM102 is arranged such that the optical axis of the light incident on the dichroic mirror DM102 forms an angle of 45 degrees with the normal to the incident surface of the dichroic mirror DM102.

In the aforementioned configuration of the apparatus, however, the optical axis of the illumination light from the illumination light source 101 to the reflecting mirror M101 is arranged in parallel with the optical axis of the projection lens 110, and the condensing effect of the condenser lens 106 converges the luminous flux toward the image display device 108R, 108G and 108B. Thus, when the apparatus is housed in an outer box 120, the probability is that spaces S1, S2 with little usefulness are created as shown by hatched portions in FIG. 6 to increase the apparatus in size.

In addition, while the aforementioned image display apparatus employs the relay lens 112, the reflecting mirrors M103, M104 and the like to form the relay system for red light, it is contemplated that a relay system formed of combined concave mirrors is used instead of the above relay system. The concave mirrors, however, are likely to suffer from aberration if light is incident thereon at a large angle, thereby possibly causing loss of light quantity or failing to achieve favorable display images.

SUMMARY OF THE INVENTION

It is an object of the present invention to propose a projection type image display apparatus which has a higher degree of freedom in arranging a color separation optical system with respect to an image light combination/projection optical system to allow the whole apparatus to be compact in size.

To achieve the aforementioned object, the present invention provides an image display apparatus comprising:

a condensing optical system for changing illumination light from a light source to converging light;

a color separation optical system having a color separation optical member for reflecting a color light component in a specific wavelength range of the converging light and transmitting color light components in the other wavelength ranges;

a plurality of image display device illuminated by a plurality of color light components separated by the color separation optical system, respectively, a color combination optical system for combining image light components of a plurality of colors emanating from the plurality of image display devices; and a projection optical system for projecting image light components combined by said color combination optical system on a surface on which projection is performed, wherein the optical axis of light incident on the color separation optical member forms an angle smaller than 45 degrees with the normal to a light incident surface of the color separation optical member.

The aforementioned invention further has a relay optical system disposed in an optical path with a length larger than the lengths of the other optical paths of a plurality of optical paths of color light components from the light source to the plurality of image display device, wherein the relay optical system includes a reflecting member having a concave-shaped reflecting surface. An angle which an optical axis of light incident on the reflecting member forms with the normal to the reflecting surface passing through the intersection of the optical axis and the reflecting surface of the reflecting member is smaller than 45 degrees.

In addition, in the present invention, an angle which an optical axis of light incident on the reflecting member forms with the normal to the reflecting surface passing through the intersection of the optical axis and the reflecting surface of the reflecting member is smaller than an angle which an optical axis of light incident on the color separation optical member forms with the normal to the light incident surface of the color separation optical member.

To achieve the aforementioned object, the present invention provides an image display apparatus comprising:

- a condensing optical system for changing illumination light from a light source to converging light;
- a color separation optical system having a color separation optical member for reflecting a color light component in a specific wavelength range of the converging light and transmitting color light components in the other wavelength ranges;
- a plurality of image display device illuminated by a plurality of color light components separated by the color separation optical system, respectively;
- a color combination optical system for combining image light components of a plurality of colors emanating from the plurality of image display devices;
- a projection optical system for projecting image light components combined by the color combination optical system on a surface on which projection is performed; and
- an outer box for housing the condensing optical system, the color separation optical system, the plurality of image display device, the color combination optical system and the projection optical system,
- wherein a wall surface closest to the condensing optical system and the color separation optical member of wall surfaces substantially perpendicular to the optical axis direction of the projection optical system in the outer box extends along a portion, which is farthest from the projection optical system, of the outer periphery of converging light incident on the color separation optical member from the condensing optical system.

The phrase "extends along" means that the wall surface is substantially in parallel with and close to the portion.

Furthermore, to achieve the aforementioned object, the present invention provides an image display apparatus comprising:

- a condensing optical system for changing illumination light from a light source to converging light;
- a color separation optical system having a color separation optical member for reflecting a color light component in a specific wavelength range of the converging light and transmitting color light components in the other wavelength ranges;
- a plurality of image display device illuminated by a plurality of color light components separated by the color separation optical system, respectively;
- a color combination optical system for combining image light components of a plurality of colors emanating from the plurality of image display devices; and
- a projection optical system for projecting image light components combined by the color combination optical system on a surface on which projection is performed,
- wherein a direction of a portion, which is farthest from the projection optical system, of the outer periphery of converging light incident on the color separation optical member from the condensing optical system is substantially perpendicular to the optical axis direction of the projection optical system.

DESCRIPTION OF THE PREFERRED EMBODIMENTS

Figure 1:
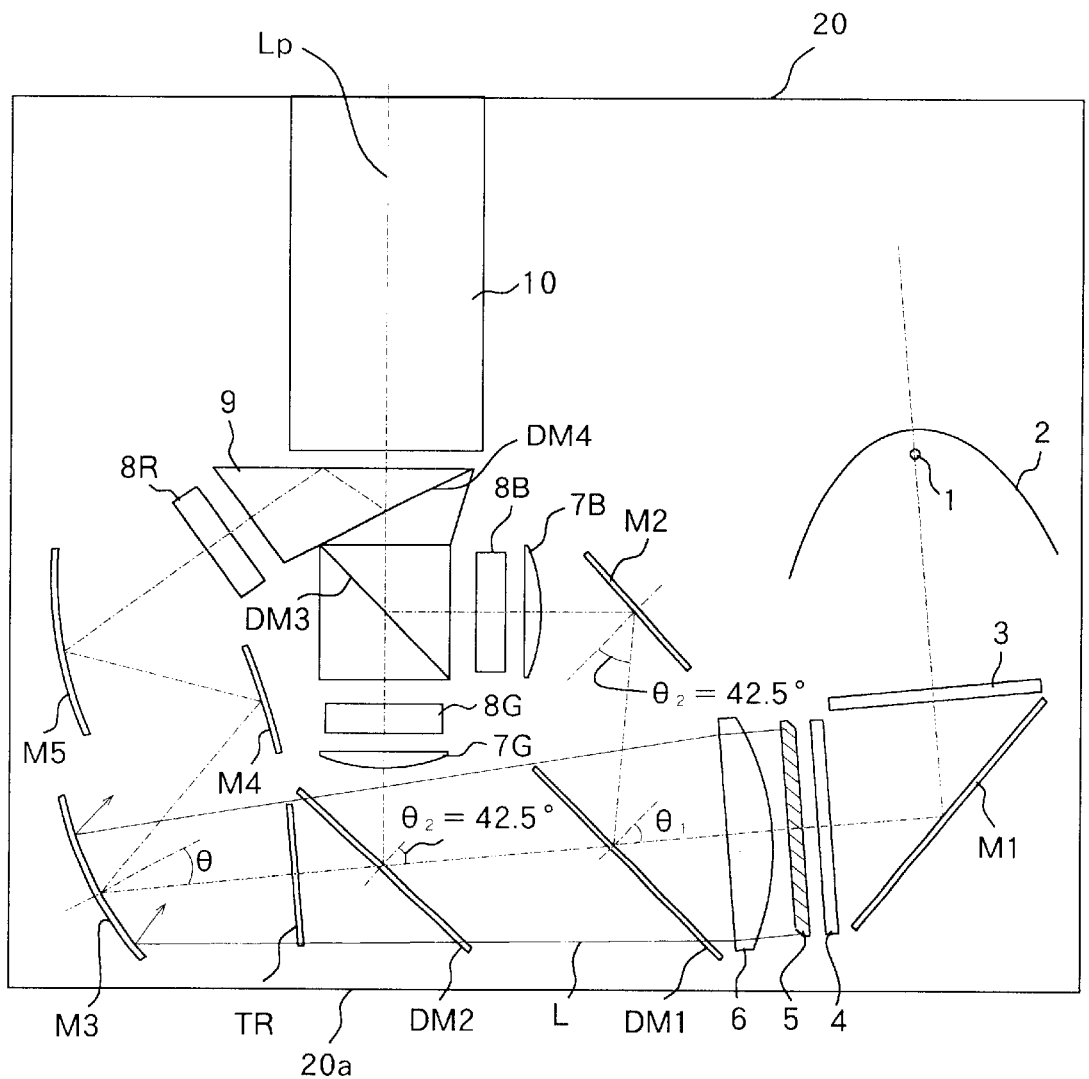
FIG. 1 is a sectional view showing the configuration of a projection type image display apparatus which is an embodiment of the present invention.
Figure 2:
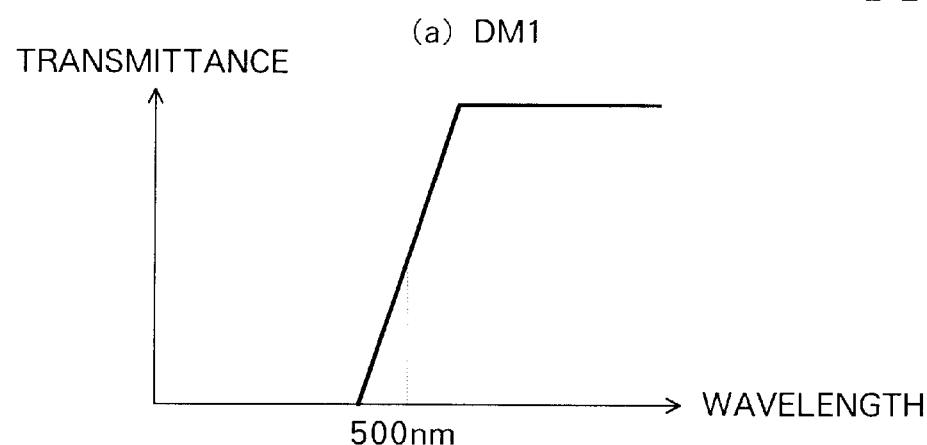
FIGS. 2(a) to 2(c) are schematic graphs illustrating the spectral characteristics of dichroic mirrors and a trimming filter used in the aforementioned image display apparatus.
Figure 2:
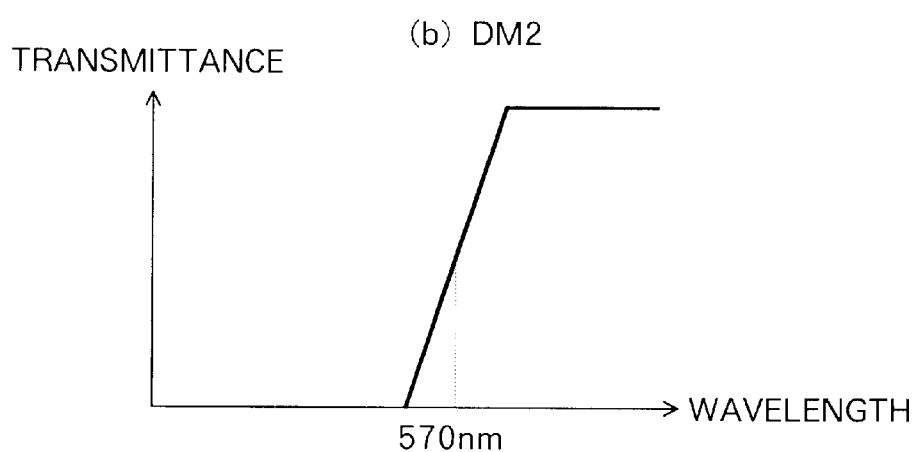
Figure 2:
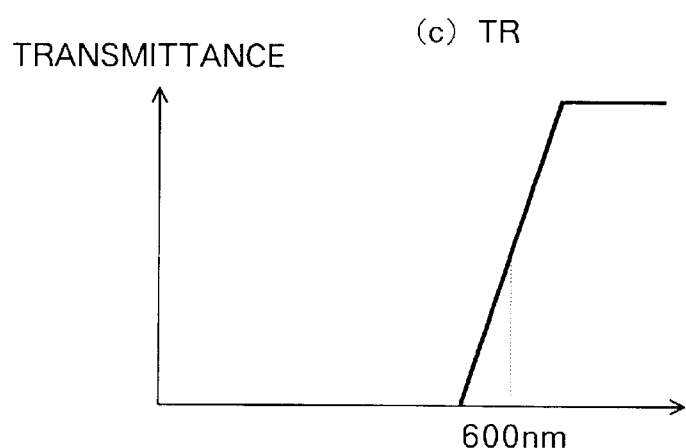

FIG. 1 shows the configuration of a projection type image display apparatus which is an embodiment of the present invention. FIG. 2 illustrates spectral transmittances of dichroic mirrors DM1, DM2 and a trimming filter TR. These spectral transmittances are exemplary values in design when an ultra-high pressure mercury lamp is used as an illumination light source. However, the numerical values are only illustrative, and the spectral transmittances are not limited to those values. In other words, various values can be set in accordance with the type of the illumination light source.

In FIG. 1, part of white light emitted from an illumination light source 1 is incident on a fly eye lens 3 as it is, while the remainder of the light is reflected by a reflector 2 and then incident on the fly eye lens 3.

The illumination light passing through the fly eye lens 3 is turned approximately 90 degrees by a mirror M1 serving as an illumination reflecting member, passes through a fly eye lens B4, a light polarization converting device 5 and a condenser lens 6 serving as a condensing optical device, and then incident on a dichroic mirror DM1.

The illumination light is subjected to a converging (condensing) effect as it passes through the condenser lens 6, and thus converging in the direction in which the illumination light travels.

The dichroic mirror DM1 has a spectral transmittance shown in FIG. 2(a), in which a light component in a wavelength range for blue is reflected and a light component in a wavelength range for green to red is transmitted.

The light component in the wavelength range for green to red transmitted through the dichroic mirror DM1 is incident on a dichroic mirror DM2. The dichroic mirror DM2 has a spectral transmittance shown in FIG. 2(b), in which a light component in a wavelength range for green is reflected and a light component in a wavelength range for red is transmitted.

The light component in the wavelength range for blue reflected by the dichroic mirror DM1 is turned by a reflecting mirror M2 serving as a light guide reflecting member, passes through a field lens 7B, and then is incident on an image display device 8B, where the light is modulated in accordance with a signal input to the image display device 8B.

The light component in the wavelength range for green reflected by the dichroic mirror DM2 passes through a field lens 7G and is incident on an image display device 8G, where the light is modulated in accordance with a signal input to the image display device 8G.

The light component in the wavelength range for red transmitted through the dichroic mirror DM2 passes through a relay system composed of a trimming filter TR having a spectral transmittance shown in FIG. 2(c), a concave mirror M3, a reflecting mirror M4 and a concave mirror M5, and is incident on an image display device 8R, where the light is modulated in accordance with an input signal. The reflecting mirror M4 may be any of a concave mirror, a convex mirror and a plane mirror.

Each of the image display device 8R, 8G and 8B is formed of a liquid crystal display panel or the like. A driving circuit, not shown, inputs driving signals to the image display devices 8R, 8G, and 8B in accordance with image information input from an image information supply apparatus such as a personal computer, a DVD player, a television and a VTR, not shown. The input driving signal drives each of the image display devices 8R, 8G and 8B to form an image for each color in accordance with the image information.

The image light component for each color, modulated by the respective image display devices 8R, 8B and 8G, is incident on a color combination prism 9. The color combination prism 9 is formed of integrally combined four prisms such that dichroic membranes DM3, DM4 are formed between respective two paired prisms.

The image light component in the blue wavelength range incident on the color combination prism 9 is reflected by the dichroic membrane DM3 within the color combination prism 9 and thus turned 90 degrees, and then emanates toward a projection lens 10.

The image light component in the green wavelength range incident on the color combination prism 9 is transmitted through the color combination prism 9 as it is and emanates toward the projection lens 10.

The image light component in the red wavelength range incident on the color combination prism 9 is totally reflected by one surface of the color combination prism 9, further reflected by the dichroic membrane DM4, and emanates toward the projection lens 10.

The optical axis of the emanating image light component for each color is substantially consistent with each other. In this manner, the image light components for red, green and blue are combined and the combined light is projected and displayed by the projection lens 10 on a screen, not shown.

In the present embodiment, the dichroic mirror DM1 is responsible for separating the optical path of the light component of the wavelength for blue from the optical paths of the light components of the wavelength for the other colors. And the dichroic mirror DM2 is disposed immediately before the image display device 8G and is responsible for separating the optical path of the light component of the wavelength for green from the optical path of the light component of the wavelength for red and for bending the optical path of the light component of the wavelength for green. The embodiment is configured such that the optical axis of the light incident on the dichroic mirrors DM1, DM2 forms an angles θ1, θ2 with the normals to the incident surfaces of the dichroic mirrors DM1, DM2, respectively. In the embodiment, the angle θ2 is 42.5 degrees (<45 degrees) and the angle θ1 is smaller than the angle θ2.

More specifically, a condensing optical system of the present embodiment has the reflecting mirror M1 for turning the optical axis of the illumination light from the illumination light source 1 approximately 90 degrees, and the condenser lens 6 for exerting the converging effect on the light reflected by this reflecting mirror M1 to cause the converging light to be incident on the dichroic mirrors DM1, DM2. The condensing optical system is arranged such that the optical axis of the illumination light from the illumination light source 1 to the reflecting mirror M1 is inclined toward the optical axis Lp (optical axis of the projection lens 10) for projection of the image light with respect to the optical axis Lp for projection.

Figure 6:
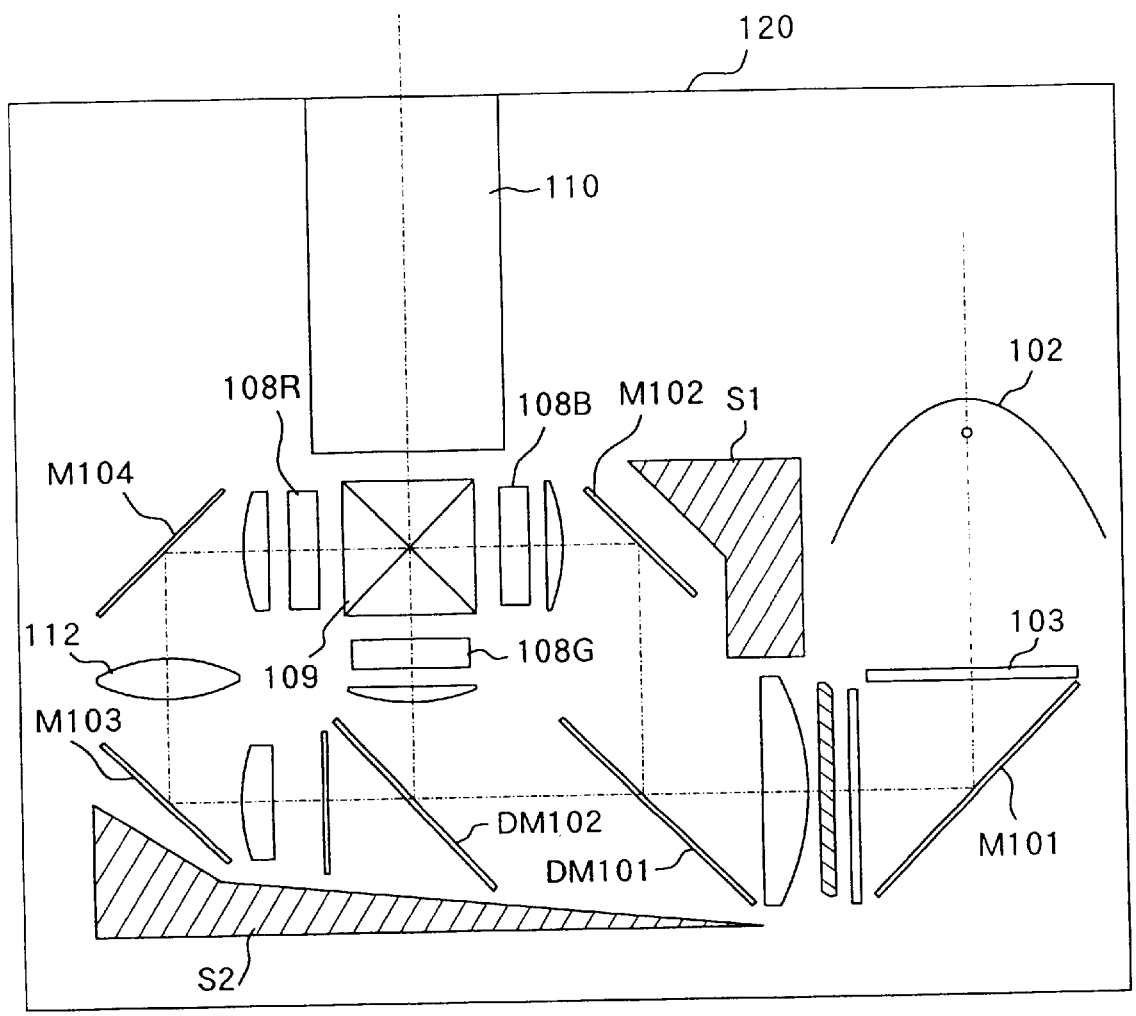
FIG. 6 shows unused spaces in the conventional image display apparatus.
Figure 4:
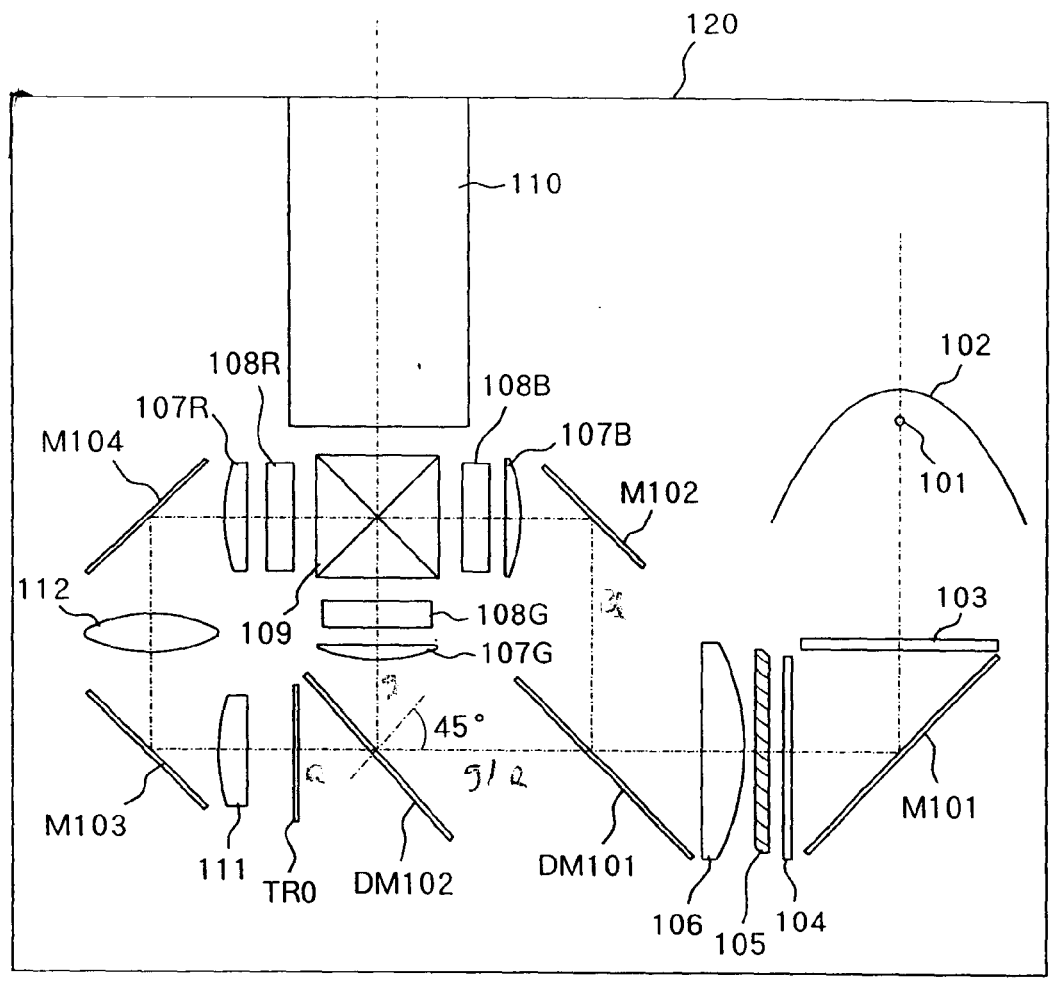
Figure 6:
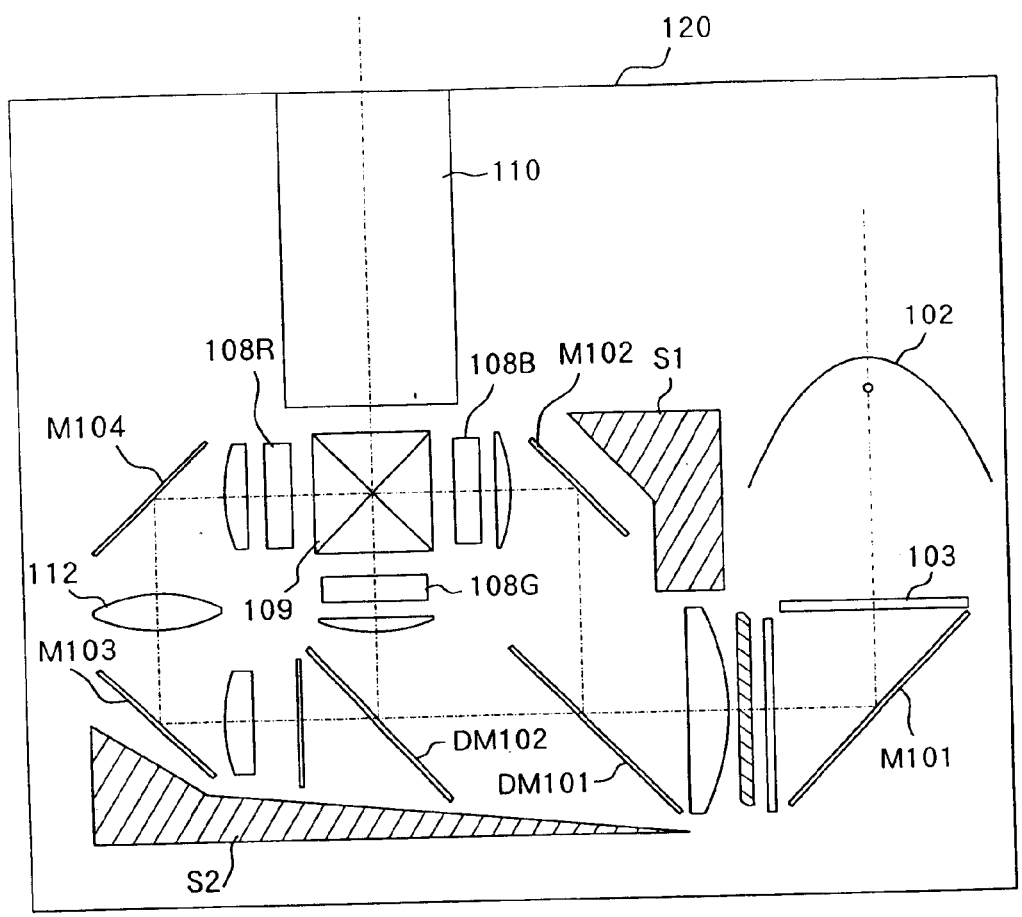

With this arrangement, the illumination light source 1 and the reflector 2 are disposed closer to the reflecting mirror M2 to reduce the hatched space S1 shown in FIG. 6.

In addition, a portion L, which is farthest from the projection lens 10, of the outer periphery of the illumination light (converging light) emanating from the condenser lens 6 extends substantially horizontally in FIG. 1 from near the outer periphery of the condenser lens 6 (in a direction substantially perpendicular to the optical axis for projection).

In other words, according to the present embodiment, a wall surface (a lower wall surface in FIG. 1) 20a closest to the condenser lens 6 and the dichroic mirrors DM1, DM2 of upper and lower wall surfaces in FIG. 1 substantially perpendicular to the optical axis direction of the projection lens 10 in an outer box 20 can extend along the portion L, which is farthest from the projection lens 10, of the outer periphery of the converging light incident on the dichroic mirrors DM1, DM2 from the condenser lens 6 such that the wall surface 20a is arranged near and substantially in parallel with the portion L. In brief, the wall surface 20a is substantially in parallel with and close to the aforementioned portion L of the outer periphery of the converge light.

With the configuration as described above, it is possible to substantially eliminate the hatched space S2 shown in FIG. 6 formed between the outer box 20 and the outer portion L of the illumination light when the display apparatus is housed in the outer box 20 which is typically formed in a generally rectangular parallelepiped.

Therefore, according to the present embodiment, the conventionally wasted spaces S1, S2 can be reduced or eliminated to allow the outer box 20 and the whole apparatus to be compact in size.

It should be noted that, with the setting of the 42.5-degree angle which the optical axis of the light incident on the dichroic mirror DM2 forms with the normal to the incident surface of the dichroic mirror DM2, a 42.5-degree angle is also set for the angle which the optical axis of the light incident on the reflecting mirror M2 arranged symmetrically to the dichroic mirror DM2 forms with the normal to the reflecting surface of the reflecting mirror M2.

In the present embodiment, the optical path length of the illumination light component in red wavelength range is larger than the other optical path lengths, and the relay system including at least two concave mirrors M3, M5 is disposed in the optical path for red. The setting of the angle between the optical axis of the incident light on the dichroic mirror DM2 and the normal to the dichroic mirror DM2 to be lower than 45 degrees as described above reduces the angle of incidence (the angle which the optical axis of the light incident on the concave mirror M3 forms with the normal to the reflecting surface of the concave mirror M3 passing through the intersection of the optical axis and the reflecting surface) θ of the illumination light component in the red wavelength range on the concave mirror M3. Thus, aberration is unlikely to occur on the concave mirror M3 to achieve a reduction in loss of light quantity or a display image of high quality.

If the angle between the optical axis of the light incident on the dichroic mirror DM2 and the normal to the dichroic mirror DM2 is 45 degrees or more, the large spaces S1, S2 with little usefulness are created as shown in FIG. 6, and the angle of the light incident on the concave mirror M3 is increased to cause aberration on the concave mirror M3, resulting in an increase in loss of light quantity.

In the present embodiment, the angle of incidence θ on the concave mirror M3 may be smaller than the angle which the optical axis of the light incident on the dichroic mirror DM2 forms with the normal to the dichroic mirror DM2.

While the present embodiment has been described for the setting of the 42.5 degrees as the angle which the optical axis of the light incident on the dichroic mirror DM2 forms with the normal to the incident surface of the dichroic mirror DM2, the present invention is not limited to this angle as long as it is smaller than 45 degrees.

Similar effects to those in the present embodiment can be achieved by setting the angles θ1, θ2 which the optical axis of the light incident on dichroic mirrors DM1, DM2 forms with the normals to the incident surfaces of the dichroic mirrors DM1, DM2 to be 30 degrees or larger and smaller than 45 degrees, more preferably 35 degrees or larger and 44 degrees or smaller.

In addition, while the present embodiment has been described for the provision of the relay system in the optical path of the light component in the wavelength range for red, the relay system may be provided in the optical path of a light component in one of the other wavelength ranges.

The present embodiment has been described for the relay system including at least two concave mirrors M3, M5 disposed in the optical path with a length larger than the other optical path lengths. The relay system, however, may be composed of a lens 11, 12, 7R and mirrors M6, M7 as shown in another embodiment in FIG. 3. In this case, wasted space can be reduced to achieve a compact apparatus by setting the angles smaller than 45 degrees as the angles which the optical axis of the light incident on the dichroic mirrors DM1, DM2 forms with the normals to the incident surfaces of the dichroic mirrors DM1, DM2, respectively, similarly to the aforementioned embodiment.

Figure 3:
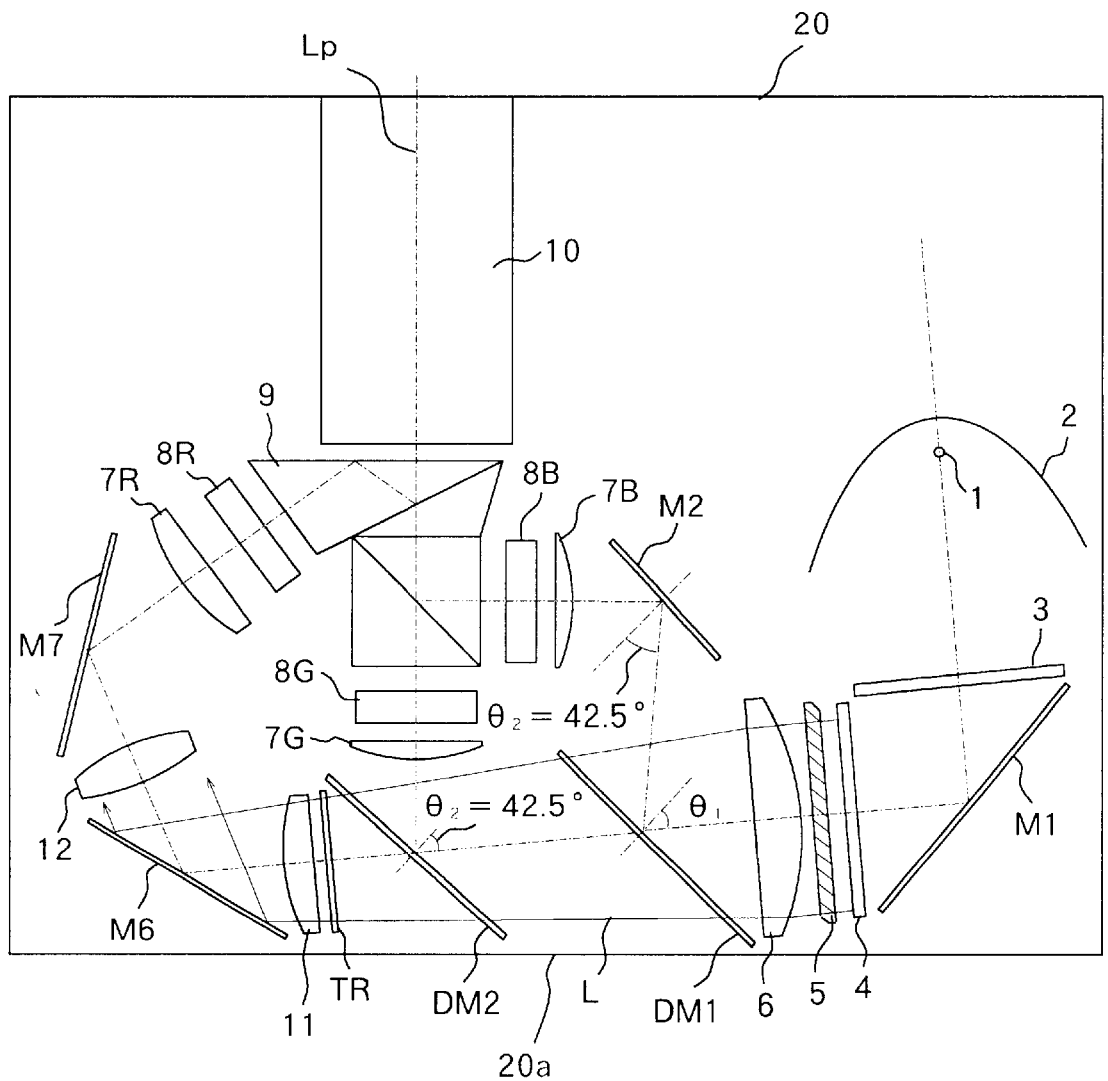
FIG. 3 is a sectional view showing the configuration of a projection type image display apparatus which is another embodiment of the present invention.

In the embodiment shown in FIG. 3, components common to the present and aforementioned embodiments are designated with the same reference numerals as the aforementioned embodiment.

In the present embodiment, similarly to the aforementioned one, a wall surface (a lower wall surface in FIG. 3) 20a closest to a condenser lens 6 and dichroic mirrors DM1, DM2 of upper and lower wall surfaces in FIG. 3 substantially perpendicular to the optical axis direction of a projection lens 10 in an outer box 20 can extend along a portion L, which is farthest from the projection lens 10, of the outer periphery of the converging light incident on the dichroic mirrors DM1, DM2 from the condenser lens 6 such that the wall surface 20a is arranged near and substantially in parallel with the portion L.

It is thus possible to substantially eliminate the hatched space S2 shown in FIG. 6 formed between the outer box 20 and the outer portion L of the illumination light and allow the outer box 20 and the whole apparatus to be compact in size.

As described above, according to the aforementioned respective embodiments, since the angle which the optical axis of the light incident on the color separation optical member forms with the normal to the light incident surface of the color separation optical member is set to be smaller than 45 degrees, the color separation optical system can be arranged with a higher degree of freedom with respect to the image light combination/projection optical system, as compared with the conventional projection type image display apparatus in which the angle between the optical axis of light incident on the color separation optical member and the normal to the light incident surface of the color separation optical member is set to be 45 degrees.

Thus, for example, when the condensing optical system is configured to have an illumination reflecting member for turning the optical axis of illumination light from a illumination light source 90 degrees and a condensing optical element for exerting a converging effect on the light reflected by the illumination reflecting member and causing the converging light to be incident on the color separation optical member, the condensing optical system can be arranged such that the optical axis of the illumination light from the illumination light source to the illumination reflecting member is inclined toward the optical axis of the projection optical system with respect to the optical axis of the projection optical system.

In addition, according to the present embodiment, the wall surface closest to the condensing optical system and the color separation optical members of the wall surfaces substantially perpendicular to the optical axis direction of the projection optical system in the outer box can extend along the portion, which is farthest from the projection optical system, of the outer periphery of the converging light incident on the color separation optical members from the condensing optical system, and furthermore, the direction of the portion, which is farthest from the projection optical system, of the outer periphery of the converging light incident on the color separation optical members from the condensing optical system can be substantially perpendicular to the optical axis direction of the projection optical system.

Therefore, for example, it is possible to substantially eliminate the conventionally wasted spaces shown as the hatched portions in FIG. 6 to allow the whole apparatus to be compact in size.

In addition, when the relay system including the concave surface reflecting members is disposed in the optical path of the color light component with a length larger than the other optical path lengths of the color light components, the angle between the optical axis of the light incident on the concave surface reflecting member and the normal to the reflecting surface of the concave surface reflecting member passing through the intersection of the optical axis and the reflecting surface is set to be smaller than 45 degrees (and smaller than the angle between the optical axis of the light incident on the color separation optical member and the normal to the light incident surface of the color separation optical member), thereby making it possible to suppress the occurrence of aberration in the relay system, and consequently, loss of light quantity is reduced and good-quality display images can be obtained.

What is claimed is:

1. An image display apparatus, comprising:
    a condensing optical system for changing illumination light from a light source to converging light;
    a color separation optical system having a color separation optical member for reflecting a color light component in a specific wavelength range of said converging light and transmitting color light components in the other wavelength ranges;
    a plurality of image display devices illuminated by a plurality of color light components separated by said color separation optical system, respectively,
    a color combination optical system for combining image light components of a plurality of colors emanating from said plurality of image display devices; and
    a projection optical system for projecting image light components combined by said color combination optical system on a surface on which projection is performed,
    wherein an optical axis of light incident on said color separation optical member forms an angle smaller than 45 degrees with a normal to a light incident surface of said color separation optical member.

2. The image display apparatus according to claim 1, wherein said condensing optical system has:
    an illumination reflecting member for turning an optical axis of illumination light from said light source substantially 90 degrees; and
    a condensing optical element for exerting a converging effect on light reflected by said illumination reflecting member to cause the converging light to impinge on said color separation optical system,
    and wherein an optical axis of illumination light from said light source to said illumination reflecting member is inclined toward an optical axis of said projection optical system with respect to the optical axis of said projection optical system.

3. The image display apparatus according to claim 1, comprising, as said color separation optical member, a plurality of color separation optical members for reflecting color light components in specific wavelength ranges different from one another,
    wherein, in each of said plurality of color separation optical members, an optical axis of incident light forms an angle smaller than 45 degrees with said normal to said light incident surface.

4. The image display apparatus according to claim 3, wherein the optical axis of the light incident on a first and a second one of the color separation optical members forms angles θ1, θ2 with said normals to said light incident surfaces, and wherein the angle θ1 is smaller than the angle θ2.

5. The image display apparatus according to claim 1, further comprising a plurality of light guide reflecting members for guiding a plurality of color light components separated by said color separation optical member to said plurality of image display devices, respectively,
    wherein an optical axis of color light incident on said each light guide reflecting member forms an angle smaller than 45 degrees with a normal to a reflecting surface of said each light guide reflecting member.

6. The image display apparatus according to claim 1, further comprising a relay optical system disposed in an optical path with a length larger than the lengths of the other optical paths of a plurality of optical paths of color light components from said light source to said plurality of image display devices,
    wherein said relay optical system includes a reflecting member having a concave-shaped reflecting surface.

7. The image display apparatus according to claim 6, wherein an angle which an optical axis of light incident on said reflecting member forms with a normal to said reflecting surface passing through an intersection of said optical axis and the reflecting surface of said reflecting member is smaller than 45 degrees.

8. The image display apparatus according to claim 6, wherein an angle which an optical axis of light incident on said reflecting member forms with a normal to said reflecting surface passing through an intersection of said optical axis and the reflecting surface of said reflecting member is smaller than an angle which an optical axis of light incident on said color separation optical member forms with a normal to a light incident surface of said color separation optical member.

9. The image display apparatus according to claim 1, further comprising:
    an outer box for housing said condensing optical system, said color separation optical system, said plurality of image display devices, said color combination optical system and said projection optical system,
    wherein a wall surface closest to said condensing optical system and said color separation optical member of wall surfaces substantially perpendicular to an optical axis direction of said projection optical system in said outer box extends along a portion, which is farthest from said projection optical system, of the outer periphery of converging light incident on said color separation optical member from said condensing optical system.

10. The image display apparatus according to claim 1, wherein a direction of a portion, which is farthest from said projection optical system, of the outer periphery of converging light incident on said color separation optical member from said condensing optical system is substantially perpendicular to an optical axis direction of said projection optical system.

11. An image display apparatus, comprising:
    a condensing optical system for changing illumination light from a light source to converging light;
    a color separation optical system having a color separation optical member for reflecting a color light component in a specific wavelength range of said converging light and transmitting color light components in the other wavelength ranges;
    a plurality of image display devices illuminated by a plurality of color light components separated by said color separation optical system, respectively;
    a color combination optical system for combining image light components of a plurality of colors emanating from said plurality of image display devices;
    a projection optical system for projecting image light components combined by said color combination optical system on a surface on which projection is performed; and
    an outer box for housing said condensing optical system, said color separation optical system, said plurality of image display devices, said color combination optical system and said projection optical system,
    wherein a wall surface closest to said condensing optical system and said color separation optical member substantially perpendicular to an optical axis direction of said projection optical system in said outer box extends parallel along to a portion, which is farthest from said projection optical system, of the outer periphery of converging light incident on said color separation optical member from said condensing optical system.

12. An image display apparatus, comprising:
a condensing optical system for changing illumination light from a light source to converging light;
a color separation optical system having a color separation optical member for reflecting a color light component in a specific wavelength range of said converging light and transmitting color light components in the other wavelength ranges;
a plurality of image display devices illuminated by a plurality of color light components separated by said color separation optical system, respectively;
a color combination optical system for combining image light components of a plurality of colors emanating from said plurality of image display devices; and
a projection optical system for projecting image light components combined by said color combination optical system on a surface on which projection is performed,
wherein a direction of a portion, which is farthest from said projection optical system, of the outer periphery of converging light incident on said color separation optical member from said condensing optical system is substantially perpendicular to an optical axis direction of said projection optical system.

13. The image display apparatus according to claim 1, wherein each of the image display devices comprises a liquid crystal display panel.

14. The image display apparatus according to claim 13, further comprising an image information supply apparatus configured to input image information to the image display devices, the image information supply apparatus being selected from the group consisting of: a personal computer, a DVD player, a television and a VTR.

15. The image display apparatus according to claim 4, wherein the angles θ1, θ2 are 30 degrees or larger and smaller than 45 degrees.

16. The image display apparatus according to claim 15, wherein the angles θ1, θ2 are 35 degrees or larger and 44 degrees or smaller.

17. The image display apparatus according to claim 4, wherein the angle θ2 is 42.5 degrees.

18. The image display apparatus according to claim 1 comprising:
a light source;
a first fly eye lens disposed to receive light from the light source;
a reflector disposed to receive a remainder of light from the light source and to reflect the light incident on the first fly eye lens;
a first reflecting mirror disposed to receive light from the first fly eye lens and to turn the light by approximately 90 degrees
an optical condenser comprised of a second fly eye lens, a light polarizer and a condenser lens disposed to receive light from the first mirror;
a first dichroic mirror disposed to receive light from the optical condenser and adapted to reflect a light component in a wavelength range for blue and to transmit a light component in a wavelength range for green to red;
a second dichroic mirror disposed to receive the green and red light component from the first dichroic mirror and adapted to reflect a light component in a wavelength range for green and to transmit a light component in a wavelength range for red;
a second reflecting mirror disposed to receive from the first dichoroic mirror the light component in the wavelength range for blue and adapted to direct the blue light component into a first field lens and then incident on a first image display device configured to modulate the blue light component in accordance with an input signal;
a second field lens and second image display device disposed to receive the light component in the wavelength range for green reflected by the second dichroic mirror and configured to modulate the green light component in accordance with a second input signal;
a relay comprising a trimming filter, a first concave mirror, a third reflecting mirror and a second concave mirror, the relay system being disposed to receive the light component in the wavelength range for red transmitted by the second dichroic mirror and being adapted to direct the red light component into a third image display device configured to modulate the red light component in accordance with a third input signal;
a color combination prism disposed to receive light from the first, second and third display devices, the color combination prism comprising four integrally combined prisms having two dichroic membranes formed between respective two paired prisms, the color combination prism, and adapted to change the optical axis of the blue, green and red light components so that the optical axis of the light emanating from the color combination prism is substantially consistent; and
a projection lens disposed to receive light from the color combination prism and to direct that light to a screen.

* * * * *

UNITED STATES PATENT AND TRADEMARK OFFICE
CERTIFICATE OF CORRECTION

PATENT NO.    : 6,637,889 B2
DATED         : October 26, 2003
INVENTOR(S)   : Kodama et al.

Figure 4:
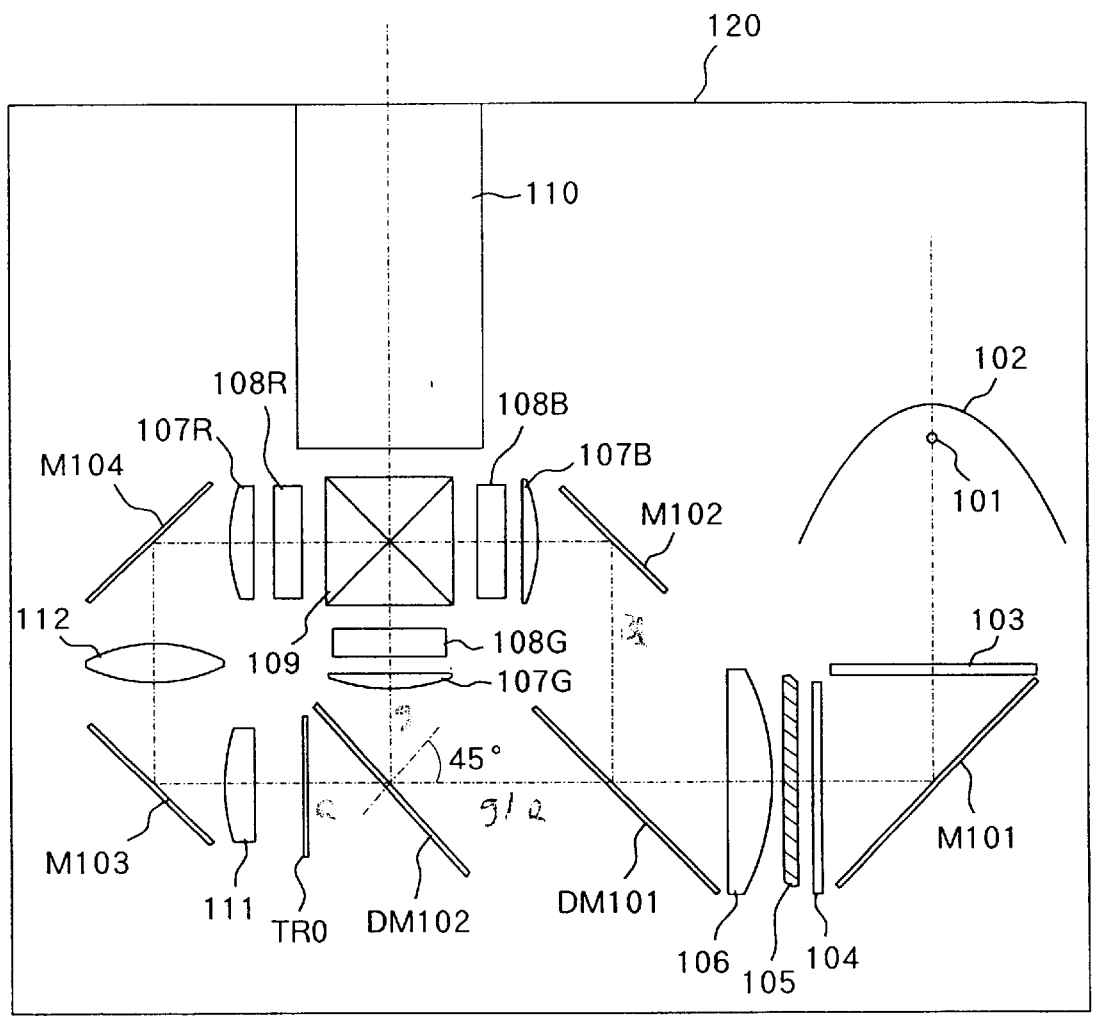
FIG. 4 is a sectional view showing the configuration of a conventional projection type image display apparatus.
Figure 5:
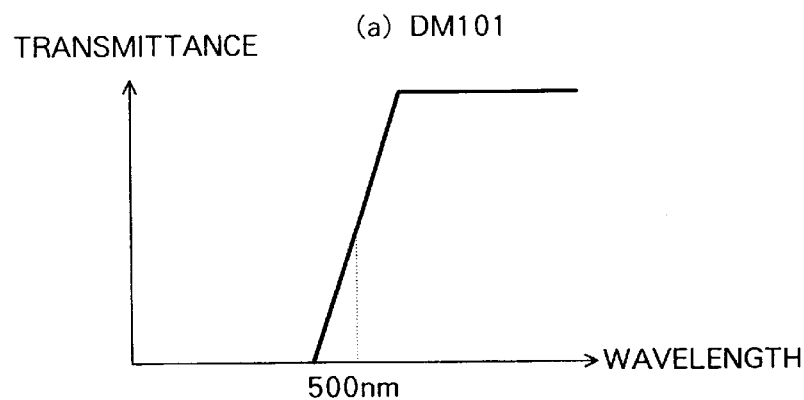
FIGS. 5(a) to 5(c) are schematic graphs illustrating the spectral characteristics of dichroic mirrors and a trimming filter used in the conventional image display apparatus.
Figure 5:
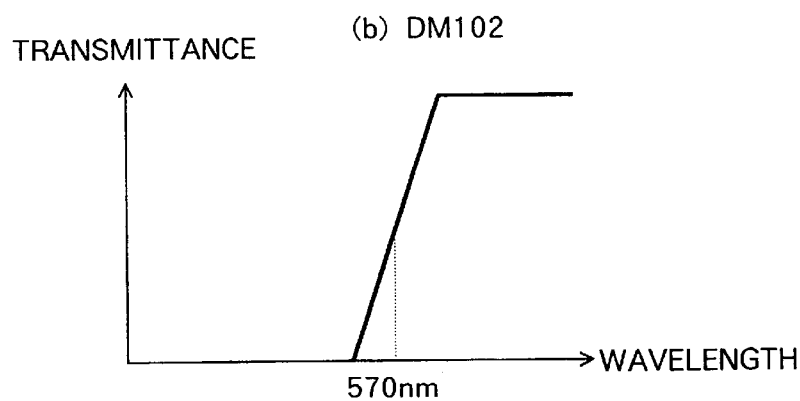
Figure 5:
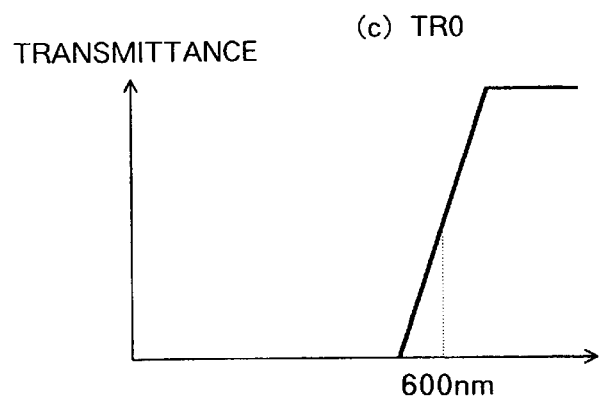

It is certified that error appears in the above-identified patent and that said Letters Patent is hereby corrected as shown below:

Drawings,
FIG. 4 and FIG. 6, insert -- PRIOR ART --.

Column 6,
Line 2, delete "an".

Column 12,
Line 33, delete "a relay comprising" and insert therefore -- a relay system comprising --.

Signed and Sealed this

Thirtieth Day of August, 2005

JON W. DUDAS
*Director of the United States Patent and Trademark Office*